Patented Jan. 6, 1942

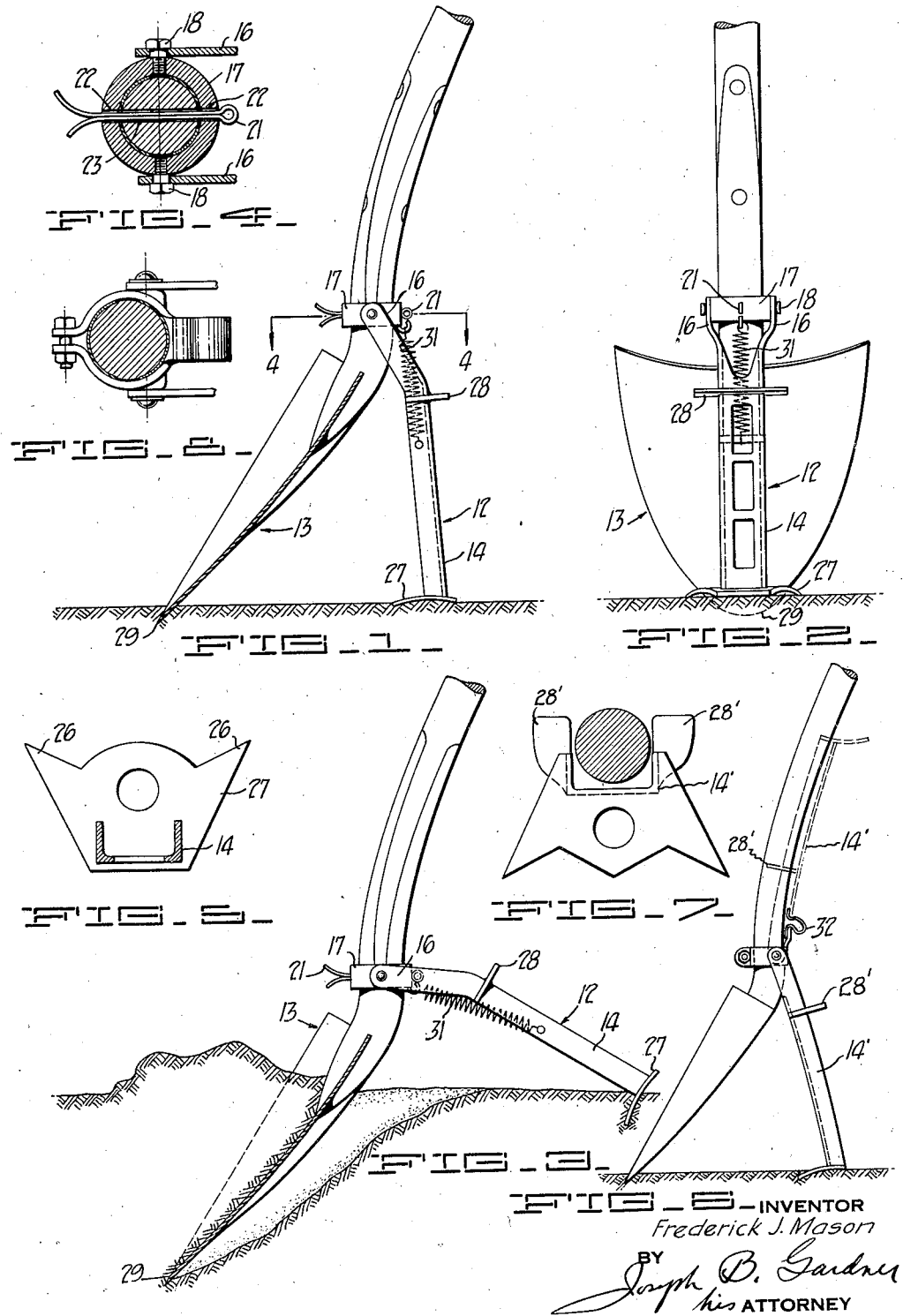

2,269,119

UNITED STATES PATENT OFFICE 2,269,119

SHOVEL ATTACHMENT

Frederick J. Mason, Oakland, Calif.

Application March 2, 1940, Serial No. 321,943

6 Claims. (Cl. 254—131.5)

The invention relates to an attachment for shovels and designed to make easier the penetration of the blade in relatively hard soil, gravel or the like.

An object of the invention is to provide an attachment of the character described, which will cause the shovel blade to move downwardly into the soil upon simply pulling the shovel handle backward.

Another object of the invention is to provide an attachment of the character described which will insure a firm engagement with the ground, so as to prevent any slipping thereover either of the shovel or the attachment during the digging operation.

A further object of the invention is to provide a device of the character described which may be readily attached to existing types and designs of shovels, and which may while attached to the shovel be instantly positioned to permit either the use of the shovel with the attachment, or the use thereof in the conventional manner practically as if the attachment was entirely removed from the shovel.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side view of my attachment as applied to a shovel and showing the same in position for initiating the digging operation.

Figure 2 is a rear view of the shovel and attachment as shown in Figure 1.

Figure 3 is a view similar to Figure 1, but showing the parts after the shovel has dug well into the ground.

Figure 4 is a cross sectional view taken through the attaching piece of the device, the line of the section being indicated by the line 4—4 of Figure 1.

Figure 5 is a cross sectional view of the attachment arm.

Figure 6 is a view similar to Figure 5, but showing a modified form of the attachment arm.

Figure 7 is a cross sectional view of the arm of the form shown in Figure 6, but showing the arm in inoperative position folded up and back against the shovel handle.

Figure 8 is a top view of the attaching piece shown in Figure 6.

Considerable difficulty is generally encountered when digging with an ordinary shovel in soil or other material which is relatively hard or in large lumps, such as gravel. Most of the trouble is due to the fact that the force required for penetration must be applied directly by the operator, such as by pressing downwardly upon the handle with the hand of the operator or by pressing the operator's foot downwardly against the top edge of the shovel blade. As may be readily understood, the downward force upon the blade is at best no greater than the downward force applied directly by the operator. Any force applied by the operator pulling the handle backwardly while pressing the blade downwardly serves merely to direct the point of the blade forwardly. The act of pulling or drawing the handle backwardly is probably the easiest of the shoveling operations, but in the use of the ordinary shovel in the conventional manner, this force does not appreciably assist in the inward or downward penetrating action of the blade. In accordance, however, with my invention, once the tip of the blade has been slightly embedded in the ground or other matter to be shoveled, the act of simply drawing the handle backwardly serves to force the blade directly into the work as well as to simultaneously direct same forwardly. Furthermore, with the means of my invention there is afforded a force amplification which makes possible a penetrating force many times greater than that produced by the application of forces in the ordinary shoveling operation. It will thus be evident that with the use of my invention, the digging operation will be rendered quite easy.

In the embodiment of my invention illustrated in Figures 1 to 5 inclusive, the device is in the form of an attachment 12 applied to the conventional shovel 13. It will be obvious of course that the attachment may be incorporated as a built-in part of the shovel. As will be clear from Figures 1 to 3 inclusive, the attachment comprises an arm 14 arranged to be connected at one end to the shovel and to engage the work at its other end. The end of the arm designed to be connected to the shovel is forked to provide ears 16 which are pivotally connected to a ring 17 such as by screws 18. The ring is arranged to be slipped over the free end of the handle and positioned in both cases just above the upper edge of the shovel blade 19. The ring is preferably secured in position on the handle by means of a cotter pin 21 which extends through openings 22 in the ring and an opening 23 in the handle, the latter opening being made available to use in attaching the ring to the handle by removing the rivet which had formerly engaged in such opening and had been originally used for assisting in securing the blade to the handle. It should be understood that in most conventional shovels the removal of one of the several rivets provided thereon for securing the blade to the handle, will not materially affect the attachment between the handle and the blade. Of course, if desired, a hole may be independently drilled in the handle for reception of the pin, or the handle attachment ring may be in the form of a two-piece clamp 23 whose segments 24 are secured about the handle by means of bolts 26.

As will be clear from the drawing, the pivotal axis of the arm 14 extends transversely of the shovel handle and widthwise of the shovel blade, and the length of the arm 14 is such that when the shovel is in an upright position the free end of the arm may engage the ground. Since the free end of the arm is designed to be anchored to the ground during the normal operation of the device, I preferably make such end of a form to insure its firm grip with the ground, such as by providing claws or teeth 26 in a foot portion 27 formed on the arm. A foot-piece 28 is desirably affixed to the arm and arranged to project from the rear side thereof, so that the operator may engage the same with his foot and thereby assist in keeping the arm in anchored position.

In the use of the device, the shovel is generally first placed in practically full upright position with the tip 29 of the blade partially inserted into the top surface of the work, as indicated in Figure 1. At the same time the arm is placed in a forward position with its claw end firmly engaging the work surface. The operator then places one foot upon the foot rest 28 and both hands upon the shovel handle, usually near the upper end thereof. He then draws backwardly upon the handle, thereby urging the blade tip forwardly. However, due to the inclination of the blade, the latter will be caused to move downwardly, that is in the direction of least resistance. Obviously, as the blade is thus forced downwardly it also moves forwardly, thereby causing the blade to assume a less inclined position as it is advanced in the digging operation. Finally, when the handle is pulled backward and downwardly sufficiently and the arm pivot approaches the ground or work surface, the effective downward and forward penetration of the blade into the work will cease and in fact the blade may be caused to elevate and at the same time raise the material contained on the blade. The operator is then ready to bodily raise the shovel with the material and remove same as may be desired.

In order to limit the forward positioning of the arm at the rear side of the blade, the bifurcated portions of the arm at its pivoted end are arranged to engage a lower portion of the handle or the top of the blade. Preferably, a spring 31 is connected to the attaching ring and to the arm, and the relationship of the parts is such that the spring will hold the arm forwardly at the back of the shovel blade for the operative position or hold the arm raised up and back against the shovel handle as when it is desired to use the shovel in a conventional manner.

In Figures 6 and 7 I have shown a somewhat modified form of the invention, the modification consisting mainly in the form of the arm 14'. In this embodiment the arm, while being of channel cross section as in the first described embodiment, has the open side of the channel in reverse relation, so that when the arm is folded upwardly against the handle, the arm may fit and partially surround the handle and thereby be less conspicuous when the arm is not being used. Preferably the arm is so shaped as to conform to the curvature of the portion of the handle against which it becomes positioned when inoperatively disposed. In this form of the invention the arm is designed to engage a spring catch 32 when the arm is placed in the operative position against the handle, and the foot rests 28' are formed as separate sections at the opposite sides of the channel.

I claim:

1. The combination with a shovel of the character described, of an arm positioned at the rear of the shovel blade and pivoted to the shovel adjacent the top of said blade for movement about a horizontal axis through the handle and being of such length that the free end thereof may engage the ground simultaneously with the shovel bottom when the shovel is in upright position, said arm having a foot rest thereon substantially adjacent its pivotal connection.

2. The combination with a shovel including a blade and handle, of an arm pivotally connected to the shovel handle adjacent the base thereof for movement about a horizontal axis and positionable at the rear of the handle or the blade and being of such length that the free end thereof may engage the ground simultaneously with the bottom of the blade when the shovel is in substantially upright position, the ground engaging end of said arm being formed with a forwardly extending ground penetrating projection, designed so as to advance into the ground as the arm is tilted forwardly.

3. In an attachment for a shovel having a blade and a handle, an arm arranged for pivotal connection to the shovel adjacent the top of the blade portion for movement about a horizontal axis through the handle to and from the rear side of the blade, a ground penetrating projection at a free end of said arm, a foot rest on said arm substantially adjacent the pivoted portion, and a spring to urge the arm toward the rear of the blade.

4. In a shovel attachment of the character described, an attachment piece arranged for positioning about the shovel handle adjacent the top of the shovel blade, an arm pivoted to such piece for movement about a horizontal axis traversing the handle and in such manner that the arm may be positioned at the rear side of the blade for movement to and from same, a ground engaging portion at a free end of said arm, said arm being made of such length that when operatively associated with the shovel said ground engaging portion may contact with the ground simultaneously with the bottom of the shovel when the shovel is in upright position.

5. In a shovel attachment of the character described, an attachment piece arranged for positioning about the shovel handle adjacent the top of the shovel blade, an arm pivoted to such piece for movement about a horizontal axis traversing the handle and in such manner that the arm may be positioned at the rear side of the blade for movement to and from same, a ground engaging portion at a free end of said arm, said arm being made of such length that when operatively associated with the shovel said ground engaging portion may contact with the ground simultaneously with the bottom of the shovel when the shovel is in upright position, and said arm being of channel cross section and conforming in general to the portion of the handle above the portion engaged by the attaching piece whereby said arm may be folded to fit back against and around the handle.

6. In a shovel attachment of the character described, an attachment piece arranged for positioning about the shovel handle adjacent the top of the shovel blade, an arm having forked end portions straddling said piece and handle and pivoted to such piece for movement about a horizontal axis traversing the handle in such manner that the arm may be positioned at the rear side of the blade for movement to and from same, a ground engaging portion at a free end of said arm, a foot rest extending rearwardly from the rear side of the arm and located substantially adjacent the pivot, said arm being made of such length that when operatively associated with the shovel said ground engaging portion may contact with the ground simultaneously with the bottom of the shovel when the shovel is in upright position, and said arm being of channel cross section and conforming in general to the portion of the handle above the portion engaged by the attaching piece whereby said arm may be folded to fit back against and around the handle.

FREDERICK J. MASON.